UNITED STATES PATENT OFFICE.

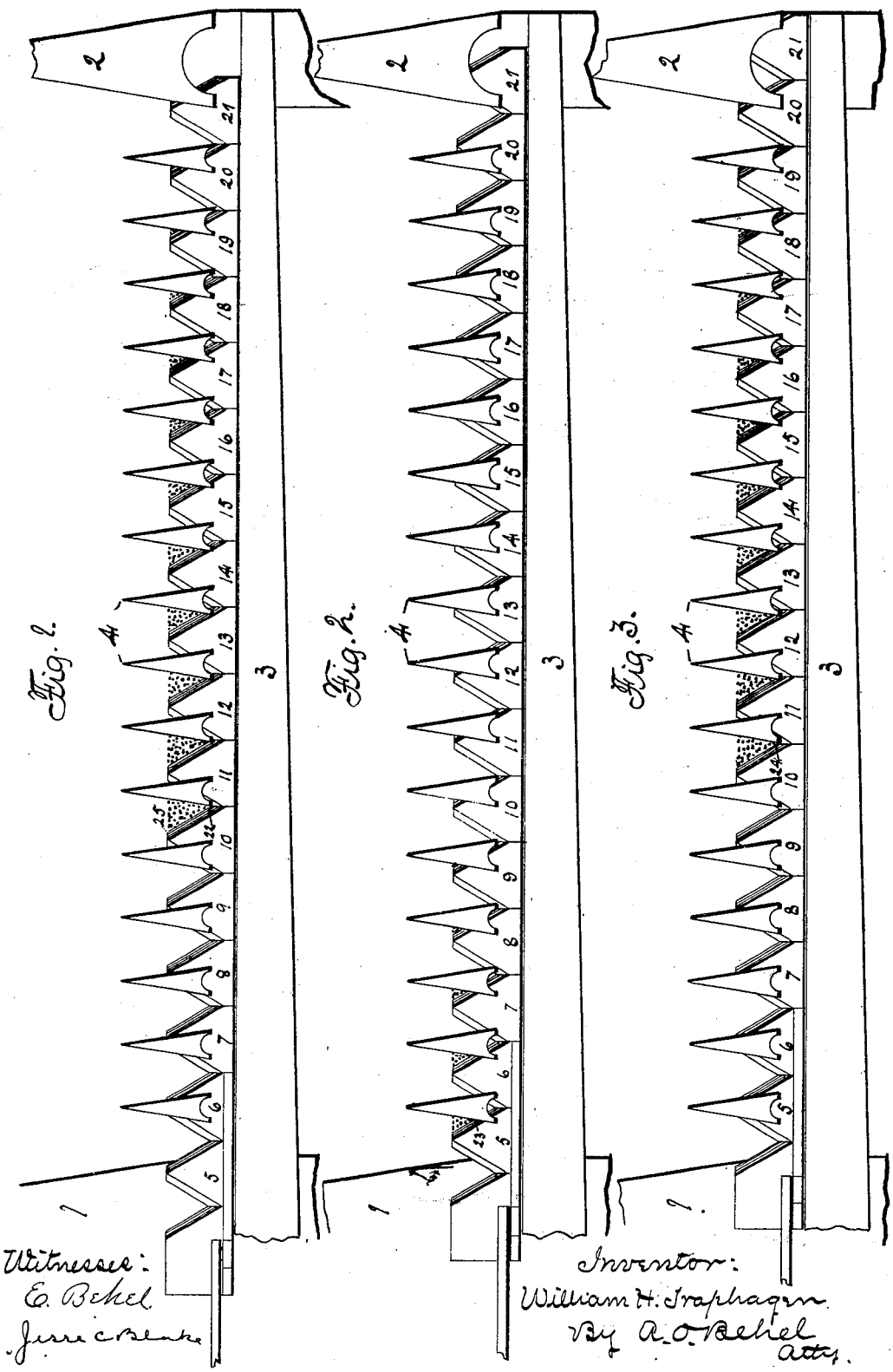

WILLIAM H. TRAPHAGEN, OF ROCKFORD, ILLINOIS, ASSIGNOR TO THE EMERSON MANUFACTURING COMPANY, OF SAME PLACE.

HARVESTING-MACHINE.

SPECIFICATION forming part of Letters Patent No. 660,280, dated October 23, 1900.

Application filed June 16, 1898. Serial No. 683,657. (No model.)

*To all whom it may concern:*

Be it known that I, WILLIAM H. TRAPHAGEN, a citizen of the United States, residing at Rockford, in the county of Winnebago and State of Illinois, have invented certain new and useful Improvements in Harvesting-Machines, including Reaping and Mowing Machines, of which the following is a specification.

One object of this invention is to construct a cutting apparatus for harvesting and mowing machines in which the guards and knife-sections are so spaced and arranged that the distance from center to center of guards differs from distance from center to center of sections and the guards of such number that there will be less sections cutting at one part or parts of the throw of the knife than at another part or parts of the throw of the knife.

A further object of this invention is to construct a cutting apparatus for harvesting and mowing machines in which the guards and knife-sections are so spaced and arranged that but few sections are cutting at the center of the stroke of the knife and a greater number cutting at the beginning and end of the stroke.

In the accompanying drawings, Figure 1 is a plan view of my improved cutting apparatus in which the knife is just commencing its outward stroke or throw, the grass or grain about to be severed being represented by dots contiguous to sections 10, 11, 12, 13, 14, 15, 16, 17, 18, 19, and 20. Fig. 2 is a similar view in which the knife is at the center of its throw or stroke, the grass or grain about to be severed being represented by dots contiguous to sections 5, 6, 7, 8, and 9. Fig. 3 is a view of the cutting apparatus in which the knife is just approaching the outer end of the stroke or throw, the grass or grain about to be severed being represented by dots contiguous to sections 10, 11, 12, 13, 14, 15, 16, 17, 18, 19, and 20.

My improved cutting apparatus consists of the inner shoe 1, outer shoe 2, finger-bar 3, supporting-guards 4, and a knife composed of the sections 5 to 21, inclusive. This cutting apparatus is designed especially for harvesting-machines where the crop to be cut is very limber—for example, fine white clover or red-top. The knife is located to move through the guards. The distance from center to center of the sections is different from the distance between the centers of the guards, and the throw of the knife is preferably equal to the distance from center to center of guards. By properly adjusting the relative distance between the centers of the sections and centers of the guards it is obvious that while the throw of the knife might remain the same the relative lengths between the centers of sections and the centers of guards would be such that the length of throw of the knife would not exactly correspond to either of these distances.

In certain conditions or kinds of grass or grain, especially where it is very limber, it is desirable that the distance from center to center of the knife-sections as compared with the distance from center to center of the guards be so regulated that but few of the sections are cutting when the knife is at the center of its throw, and consequently the leverage is the weakest to overcome the shearing motion, (the velocity of the knife counting but little in this kind of grass,) and most of the cutting being done near the ends of the stroke, when the crank exerts its greatest force, and the grass to be cut bends one way or the other until it is cut off by the shearing motion, the crank and pitman at the end of the throw constituting an elbow or Franklin joint and getting the strongest force to enable the knife to overcome the resistance of the shearing cut of the larger number of sections. The cutting of the knife is like that of a pair of shears, and no cutting of any consequence in almost every kind and condition of grass is done until the edge of the section begins to cross the edge of the guard. In the cutting apparatus now in use, where the distance from center of the sections is the same as the distance from center to center of the guards, but little cutting is done until the cutting edges of the sections begin to cross the cutting edges of the guards, and if the motion of the knife is very high, so that the machine does not advance in proportion to the surface cut by the knife, most of the cutting is done by the forward half or two-thirds of the sections. It is obvious that most of the labor of the knife is done during about one-third of its throw. The result is a heavy chuck toward the end of each stroke and consequent wear on portions of the pitman and wrist-pin and greater danger of the machine being choked by having all of the labor of cutting thrown on the machine at some particular portion of the stroke of the knife, and the same rule would apply if the distance from guard to guard were an even fraction of the distance from center to center of the sections, or vice versa.

In Fig. 1, where the knife is just beginning its throw to the right, section 10 will begin its shear-cutting at 22, and the sections 11, 12, 13, 14, 15, 16, 17, 18, 19, and 20 are also cutting when the two cutting edges come together, the cutting-point being higher on each section while the remaining sections are not cutting. When the knife has made half of its throw, as shown at Fig. 2, it will be seen that section 5 will begin its cutting at the point 23 and sections 6, 7, 8, and 9 are cutting at some point of their length while the remaining sections are not cutting. When near the end of the stroke to the right, as shown at Fig. 3, section 10 will begin its shear-cutting at 24, while the sections 11, 12, 13, 14, 15, 16, 17, 18, 19, and 20 are cutting at some point of their length and the remaining sections are not cutting. Thus it will be seen that but few sections are cutting at the center of the stroke, and a greater number are cutting at the beginning and end of the stroke, and each section is cutting at some part of the stroke the full length of its cutting edge, providing the advance of the machine during each stroke of the knife is equal to the distance from 22 to 25, Fig. 1. In practice it is found that a higher speed works better. Consequently the cutting would, if the higher speed were used and the guards and sections spaced with relation to each other as supposed above, be done in advance of the point at which it would be done if the finger-bar were maintained in a fixed position or relation to the truck of the wheels; but this is not desirable, and by having the finger-bar hinged to the coupling-bar and the coupling-bar hinged to the machine either above or below the plane of the center of the crank-shaft the finger-bar is changed by the inequality of the ground. The relative position of each knife-section to the guard at the commencement of the stroke is different from what it would be if the fingers were at the lower level. In other words, while the change is being made the relative distance the machine advances to the length of stroke is changed and also the cutting portion of each section is changed. In this way it is found that as the finger-bar is constantly rising and falling it receives a constant change as to where the principal amount of cutting is done on each section.

By my arrangement the slightest movement of the knife will begin cutting, and the amount of cutting will continue about even throughout the whole of the stroke, while in the old construction about one-half of its movement before any of the sections are in a condition to commence cutting. Then all commence cutting together with a chuck or jerk. The consequence is to strain the machine, and all of the wear comes on one side of the wrist-pin of the crank, which is the reason that one side of the wrist-pin is worn away, while the other side remains unworn. This chuck of the knife is what frequently causes the machine to clog up and stop with a jerk, which often breaks some part, while in my construction it is obvious from the drawings that the sections work in series. Consequently there is no chuck, and the liability of choking down, stopping, or breaking the machine is much diminished.

It is obvious that while the combinations of guards and sections herein set forth is the best for some crop conditions they can still be used fairly well for most or all other crop conditions.

I claim as my invention—

A cutting apparatus having the distance from center to center of guards different from distance from center to center of sections, and the guards of such number the relative positions of the sections and guards at the beginning of the stroke being such and the stroke being of such length that less sections will be cutting at the middle of the stroke of the knife than the ends of the stroke.

WILLIAM H. TRAPHAGEN.

Witnesses:
A. O. BEHEL,
E. BEHEL.